July 7, 1970            H. NOLIN ET AL            3,519,837
AUTOMATIC PRECIPITATION LIGHT CONTROL FOR VEHICLES
Filed Dec. 3, 1968
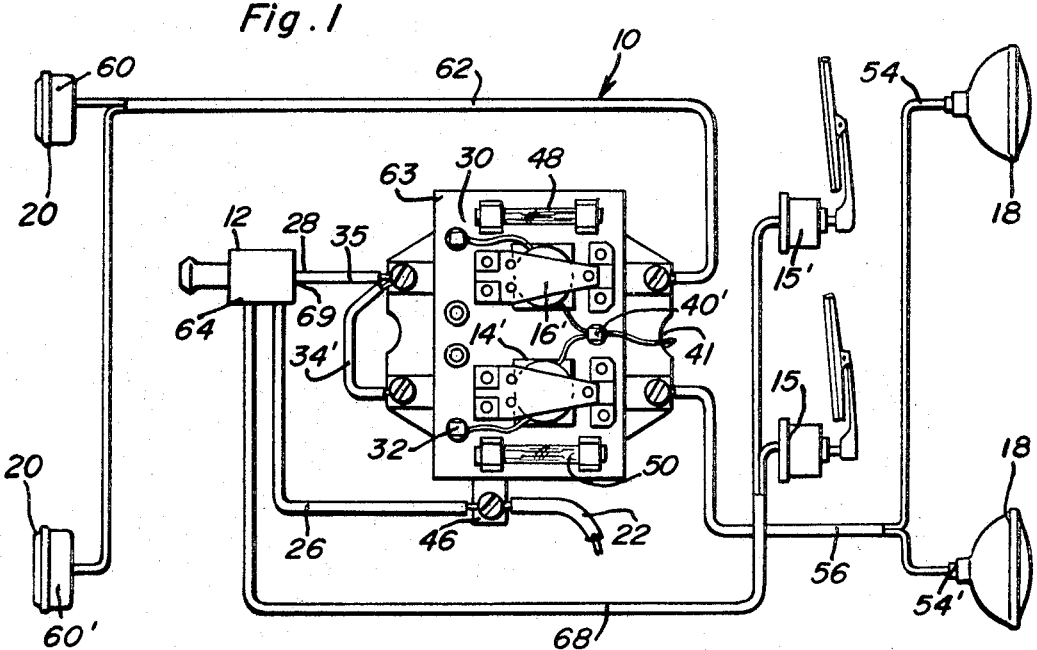
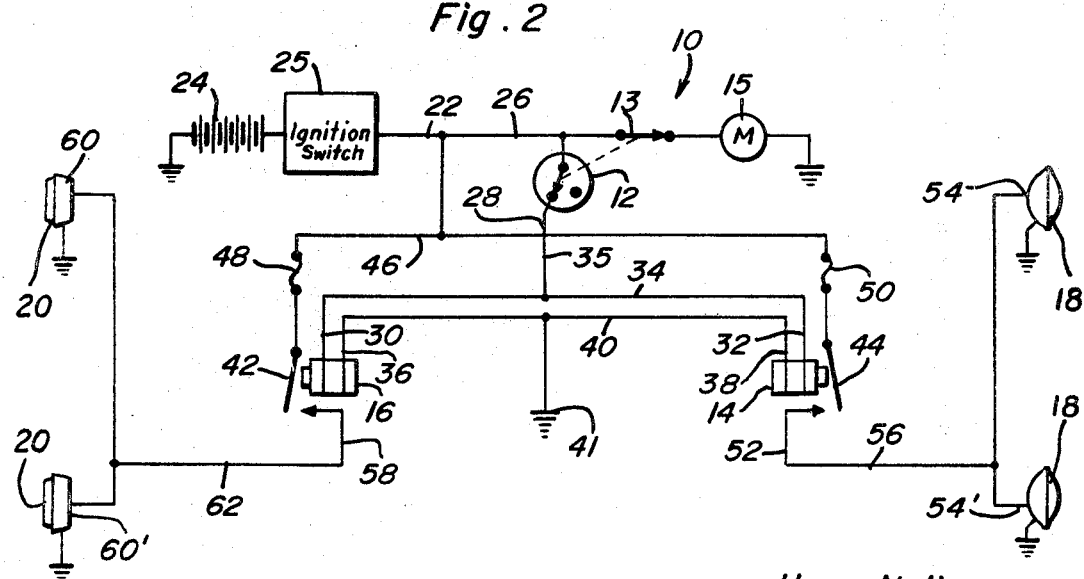
Huey Nolin
John F. Lidinsky
INVENTORS

3,519,837
AUTOMATIC PRECIPITATION LIGHT CONTROL FOR VEHICLES

Huey Nolin, Riviera Beach, and John F. Lidinsky, Lake Park, Fla., assignors to Rain Safety Light, Inc., a corporation of Florida
Filed Dec. 3, 1968, Ser. No. 780,799
Int. Cl. B60q *1/04*
U.S. Cl. 307—10                                   6 Claims

ABSTRACT OF THE DISCLOSURE

A relay assembly is connected between the ignition switch of a vehicle and the head- and taillights thereof. A relay energizing switch is mechanically coupled to the windshield wiper switch of the vehicle. Actuation of the wiper switch causes energization of the relay assembly which in turn completes a circuit between the terminals of the ignition switch and the vehicle lights. Thus, when the windshield wipers are turned on, the vehicle lights are automatically turned on therewith.

---

The present invention relates to an automotive vehicle safety accessory and more particularly to a light control switch which becomes operable when vehicle windshield wipers are employed.

Current automobiles come equipped with electric windshield wipers which become operable when an associated dashboard switch is actuated. Although precipitation conditions usually force the motorist to turn the windshield wipers of his vehicle on, motorists frequently forget to turn on the vehicle headlights and taillights as required for safe driving. Further, it has been the experience of many motorists who do turn their lights on during precipitation conditions to forget to turn the vehicle lights off when stopping vehicle operation. This is particularly true during daytime hours when it is difficult to detect that the vehicle lights are on. As a result of the latter condition, the battery drains during a period when the vehicle is idle which often makes starting of the vehicle with the remaining battery power impossible. As will be appreciated, this situation causes a great deal of inconvenience to the unfortunate motorist when he next attempts to start his car.

The primary purpose of the present invention is to promote safety for the millions of automobiles in use on our highways. The basic function of the present invention is to automatically energize the headlights and taillights of a motor vehicle when a windshield wiper switch is turned on during periods of precipitation. The invention assists in preventing accidents when vision is impaired due to rain, fog, snow or other precipitation conditions. Inasmuch as many states require that headlights be turned on during precipitation conditions, the invention automatically causes the motorist to comply with state law.

Another aspect of the invention deals with the particular connection of the system to an existing automobile electrical system. This connection permits the automatic and simultaneous operation of the windshield wipers and vehicle headlights during automobile operation. However, when the vehicle ignition is turned off, the present system is de-energized thereby stopping windshield wiper operation and vehicle light energization, which in turn prevents accidental and unnecessary drain on the vehicle battery.

The invention does not have any effect on the conventional headlight switch. Thus, to turn on the vehicle head and tail lights during periods when the windshield wiper is not in operation, the motorist merely uses the headlight switch in the usual manner.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a diagrammatic mechanical representation of the present invention when connected to the electric windshield wipers and lights of an automotive vehicle.

FIG. 2 is an electrical schematic diagram of the invention.

The present invention may basically be characterized as a relay assembly which can be installed in existing automobiles by simply reconnecting certain leads in the electrical system of the vehicle. However, the universal application of the present invention may be equally employed in designs for future vehicles. For purposes of facilitating the understanding of the present invention, an explanation of the electircal operation is first offered by referring to FIG. 2 wherein the electric circuit of the present invention is generally indicated by reference numeral 10. The system includes a switch section 12 which is mechanically linked to the switch section 13 controlling operation of electric windshield wiper motor 15. The effect of this connection would be to turn switch 12 on at the same time that the windshield wipers are activated. In brief, actuation of switch 12 causes a response in parallel connected relays 14 and 16 which in turn cause energization of headlights 18 and taillights 20.

In detail, the present invention is supplied with power through a lead 22 which is connected to an output terminal of a conventional ignition switch 25. The input to the ignition switch is of course connected to the positive terminal of the vehicle battery 24. Thus, the invention is rendered inoperative when the ignition switch is turned off. This particular feature prevents the vehicle lights from remaining on after the ignition is turned off, with switch 12 being accidentally retained in the on condition, which frequently occurs during precipitation conditions at daylight. The opposite end of lead 22 is connected to the movable contact by conductor 26. The output terminal 28 of the switch 12 represents a terminal that is engaged by the movable contact of the switch during all phases of multispeed wiper switch operation. The invention is designed in this manner so that at any selected speed of the wiper, the lights will remain on. Connecting lead 35 is disposed between the output terminal 28 of switch 12 and bus wire 34, the latter interconnecting the input coil terminals 30 and 32 of relays 16 and 14 respectively. A second bus wire 40, which is grounded, interconnects the input coil terminals 36 and 38 of relays 16 and 14 respectively. The connection of bus wire 40 to ground is indicated by 41.

Referring to relay 16 associated with taillights 20, a movable relay contact 42 is connected to the ignition switch output through a series path including bus wire 46 and safety fuse 48. In a similar manner, the movable contact 44 associated with relay 14, which controls the forward vehicle lights 18, is connected to bus wire 46 through a series path including a second safety fuse 50.

Concentrating for the moment on relay 14, the stationary contact 52 of the relay is connected to the "hot" terminals 54 and 54' of the headlights 18 by means of a connecting lead 56. Similarly, relay 16 includes a stationary contact 58 which is in turn connected to the "hot" terminals 60 and 60' of the rear vehicle lights 20 by a connecting lead 62.

In operation of the device, with the ignition switch 25 on, a motorist turns switch 12 on thereby causing current to flow from the DC battery 24 to the relay coils via ignition switch 25. Two relays are used instead of one because were one used, the output thereof would interconnect the tail and headlights of the vehicle. Thus, during normal operation of the vehicle energization of the parking lights during periods of dusk or similar circumstances would cause the unnecessary lighting of the interconnected headlights.

A typical mechanical layout is schematically shown in FIG. 1. As will be noted, relays 14 and 16 are mounted on a plate 63. Wiring interconnecting the relays and the fuses 48 and 50 is disposed beneath the plate (not shown). The lead 22 is connected between the ignition switch and a terminal lug 46 appending outwardly from mounting plate 63. A second lead 26 is connected between the terminal lug 46 and the windshield wiper switch 12. The latter mentioned lead provides input current to the switch 12 when the windshield wiper switch is manually actuated by a motorist. A first output terminal 64 of switch 12 connects a lead 68 to the electric windshield wiper motors 15 and 15'. A second output terminal 28 provides energizing current for the relays 14 and 16 when the wiper switch 12 is actuated. Thus, as will be appreciated, windshield wiper action and the lighting of the headlights 18 and taillights 20 occurs simultaneous with the actuation of switch 12.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a vehicle having a voltage source connected to a windshield wiper motor by a wiper control switch and vehicle lamps, a control comprising first switch means operable in response to actuation of the wiper control switch, second switch means having an output, the second switch means responding to the first switch means for producing a voltage at said output, means adapted to connect the vehicle lamps to said output for causing energization thereof upon the production of a voltage at said output, whereby lighting occurs automatically in response to actuation of the wiper control switch.

2. An automotive vehicle having an electrical windshield wiper assembly, the vehicle including forward and rearward lights, a control system comprising first switch means actuatable in response to operation of the wiper assembly, second switch means having an output, the second switch means responding to the first switch means for producing a voltage at said output, means adapted to connect the forward and rearward lights to said output for causing energization of the lights upon the occurrence of a voltage at said output, whereby the vehicle lights are automatically lit in response to the operation of the windshield wiper assembly thereby promoting safer operation of the vehicle during precipitation conditions.

3. The system set forth in claim 2 wherein said second switching means include an electromagnetic assembly having switch contacts connected between the voltage source and the vehicle lights, the contacts being closable in response to actuation of the first switch means.

4. The system set forth in claim 3 wherein the electromagnetic assembly includes two relays having individual contacts connected between the voltage source and the forward and rearward vehicle lights respectively.

5. The system set forth in claim 2 wherein the first switch means include a switch section mechanically coupled to the wiper switch, whereby actuation of the wiper switch causes simultaneous energization of the wipers and the vehicle lights.

6. The system set forth in claim 2 wherein the vehicle further includes an ignition switch, and wherein the first switch means remains inoperative during periods when the ignition switch is open.

References Cited

UNITED STATES PATENTS

| | | | |
|---|---|---|---|
| 2,598,056 | 5/1952 | Hollins | 315—82 X |
| 2,650,355 | 8/1953 | Pieczonka. | |
| 3,262,011 | 7/1966 | Cones | 315—82 |
| 3,341,736 | 9/1967 | Fortney | 315—82 |

ROBERT K. SCHAEFER, Primary Examiner

T. B. JOIKE, Assistant Examiner

U.S. Cl. X.R.

315—82